US011077797B2

(12) United States Patent
Henion

(10) Patent No.: US 11,077,797 B2
(45) Date of Patent: Aug. 3, 2021

(54) REAR VIEW DEVICE, METHOD FOR ITS ASSEMBLY AND MOTOR VEHICLE WITH A REAR VIEW DEVICE

(71) Applicant: MOTHERSON INNOVATIONS COMPANY LIMITED, London (GB)

(72) Inventor: Paul R. Henion, Troy, MI (US)

(73) Assignee: MOTHERSON INNOVATIONS COMPANY LIMITED, London (GB)

(*) Notice: Subject to any disclaimer, the term of this patent is extended or adjusted under 35 U.S.C. 154(b) by 295 days.

(21) Appl. No.: 16/210,664

(22) Filed: Dec. 5, 2018

(65) Prior Publication Data

US 2019/0176703 A1    Jun. 13, 2019

(30) Foreign Application Priority Data

Dec. 7, 2017  (DE) ............... 10 2017 129 186.5

(51) Int. Cl.
*B60R 1/06*      (2006.01)
*B60R 1/074*     (2006.01)
*B60R 1/12*      (2006.01)
*B60R 1/076*     (2006.01)
*B62D 65/16*     (2006.01)

(52) U.S. Cl.
CPC ............... *B60R 1/06* (2013.01); *B60R 1/074* (2013.01); *B60R 1/12* (2013.01); *B60R 1/0605* (2013.01); *B60R 1/0617* (2013.01); *B60R 1/076* (2013.01); *B60R 2001/1215* (2013.01); *B60R 2001/1253* (2013.01); *B62D 65/16* (2013.01)

(58) Field of Classification Search
CPC ........... B60R 1/074; B60R 1/076; B60R 1/06; B60R 1/0605; B60R 1/0617; B60R 1/072; B60R 2001/1215; B60R 2001/1253; B62D 65/16

See application file for complete search history.

(56) References Cited

U.S. PATENT DOCUMENTS 2,999,707 A * 9/1961 Kniepkamp .......... F16F 3/0935
                                              403/225
3,635,435 A * 1/1972 Perison, Sr. .............. B60R 1/04
                                              248/549

(Continued)

FOREIGN PATENT DOCUMENTS

DE            1967548 U       8/1967
DE            2113622 A1 *   11/1972 .......... F16C 11/0604
WO    WO 2014/206926 A1     12/2014

OTHER PUBLICATIONS

German office action dated Sep. 14, 2018 of application DE 10 2017 129 186.5.

*Primary Examiner* — Jonathan Liu
*Assistant Examiner* — Taylor L Morris
(74) *Attorney, Agent, or Firm* — Jones Day

(57) ABSTRACT

A rear view device for a motor vehicle includes a base portion mountable to the motor vehicle, an arm portion for carrying a head with at least one of a reflective element, a display element, and a camera, the arm portion being pivotable relative to the base portion around a bolt, the bolt providing a pivot axis, extending through an opening of the base portion and an opening of the arm portion, and fixed within the base portion, a sequence of a first base plate part, a second base plate part, and a spring, and a bearing part which is inserted into the opening of the arm portion.

7 Claims, 2 Drawing Sheets

(56) References Cited

U.S. PATENT DOCUMENTS

| | | | | |
|---|---|---|---|---|
| 3,784,149 A * | 1/1974 | Brudy | B60R 1/0617 | 248/478 |
| 3,887,156 A * | 6/1975 | Hugonnier | B60R 1/06 | 248/549 |
| 4,030,692 A * | 6/1977 | Szilagyi | B60R 1/06 | 248/487 |
| 4,125,244 A * | 11/1978 | Lukey | B60R 1/076 | 248/475.1 |
| 4,186,905 A * | 2/1980 | Brudy | B60R 1/0617 | 16/321 |
| 4,558,840 A * | 12/1985 | Manzoni | B60R 1/064 | 248/484 |
| 4,600,334 A * | 7/1986 | Soussloff | F16D 1/094 | 242/573 |
| 4,668,059 A * | 5/1987 | Ohyama | B60R 1/04 | 248/467 |
| 4,681,409 A * | 7/1987 | Enomoto | B60R 1/074 | 248/478 |
| 4,824,065 A * | 4/1989 | Manzoni | B60R 1/064 | 248/483 |
| 4,969,232 A * | 11/1990 | Michel | B60B 33/0002 | 16/350 |
| 5,088,679 A * | 2/1992 | Ogasawara | B60R 1/074 | 248/479 |
| 5,432,641 A * | 7/1995 | Mochizuki | B60R 1/074 | 359/841 |
| 5,946,151 A * | 8/1999 | Levko | B60R 1/072 | 248/481 |
| 6,007,446 A * | 12/1999 | Lang | B60R 1/074 | 475/149 |
| 6,109,586 A * | 8/2000 | Hoek | B60R 1/076 | 248/476 |
| 6,183,098 B1 * | 2/2001 | Martin | B60R 1/06 | 359/841 |
| 6,283,863 B1 * | 9/2001 | Lang | B60R 1/074 | 464/44 |
| 6,390,630 B1 * | 5/2002 | Ochs | B60R 1/074 | 248/478 |
| 6,394,687 B1 * | 5/2002 | Lee | E05D 11/1007 | 403/322.1 |
| 6,402,330 B1 * | 6/2002 | Scheidegg | B60R 1/0605 | 359/871 |
| 6,558,066 B1 * | 5/2003 | Zimmer | B60S 1/34 | 403/374.4 |
| 6,874,896 B2 * | 4/2005 | Yoshida | B60R 1/072 | 359/841 |
| 7,165,852 B2 * | 1/2007 | Pavao | B60R 1/06 | 248/479 |
| 7,207,684 B2 * | 4/2007 | Huprikar | B60R 1/076 | 248/479 |
| 7,261,272 B2 * | 8/2007 | Courbon | B60R 1/0605 | 248/289.11 |
| 7,290,890 B2 * | 11/2007 | Yoshida | B60R 1/074 | 359/841 |
| 7,303,297 B1 * | 12/2007 | Foote | B60R 1/074 | 359/879 |
| 7,452,088 B2 * | 11/2008 | Brester | B60R 1/076 | 248/478 |
| 7,488,081 B2 * | 2/2009 | Yoshida | B60R 1/074 | 359/841 |
| 7,594,731 B2 * | 9/2009 | Sinelli | B60R 1/025 | 248/479 |
| 7,857,278 B2 * | 12/2010 | Yoshida | B60R 1/074 | 248/479 |
| 7,878,477 B2 * | 2/2011 | Courbon | B60R 1/0605 | 248/475.1 |
| 7,883,224 B2 * | 2/2011 | Onuki | B60R 1/074 | 359/841 |
| 8,152,124 B2 | 4/2012 | Branham et al. | | |
| 8,209,816 B2 * | 7/2012 | Heger | B60R 1/06 | 16/330 |
| 8,297,762 B2 * | 10/2012 | Sakata | B60R 1/076 | 359/841 |
| 8,517,331 B2 | 8/2013 | Roberts et al. | | |
| 8,690,366 B2 * | 4/2014 | Sakata | B60R 1/076 | 359/872 |
| 8,720,845 B2 | 5/2014 | Courbon et al. | | |
| 9,359,011 B2 * | 6/2016 | Fathollahi | F16B 5/0621 | |
| 9,555,741 B2 * | 1/2017 | Di Giusto | B60R 1/076 | |
| 9,630,559 B2 * | 4/2017 | Umino | B60R 1/074 | |
| 2002/0163745 A1 * | 11/2002 | Sakamoto | B60R 1/072 | 359/872 |
| 2006/0023326 A1 * | 2/2006 | Onuki | B60R 1/074 | 359/879 |
| 2006/0103957 A1 * | 5/2006 | Olijnyk | B60R 1/0605 | 359/872 |
| 2007/0211356 A1 * | 9/2007 | Brester | B60R 1/076 | 359/872 |
| 2013/0038957 A1 * | 2/2013 | van Stiphout | B60R 1/0617 | 359/872 |
| 2013/0083412 A1 * | 4/2013 | Sakata | B60R 1/076 | 359/841 |
| 2013/0107383 A1 * | 5/2013 | Kudo | B60R 1/074 | 359/841 |
| 2016/0102702 A1 * | 4/2016 | Lang | E05D 11/1078 | 248/479 |
| 2017/0106799 A1 * | 4/2017 | Di Gusto | B60R 1/076 | |

* cited by examiner

REAR VIEW DEVICE, METHOD FOR ITS ASSEMBLY AND MOTOR VEHICLE WITH A REAR VIEW DEVICE

CROSS-REFERENCE TO RELATED APPLICATION

This application claims the benefit of foreign priority to German Patent Application No. DE 10 2017 129 186.5, filed Dec. 7, 2017, which is hereby incorporated by reference in its entirety for all purposes.

BACKGROUND

1. Field of the Invention

The following description relates to a rear view device for a motor vehicle, a method for its assembly, and a motor vehicle including such a rear view device.

2. Related Art

Different functions and devices can be incorporated into and/or controlled with the help of rear view devices. Of particular interest are functions and devices to enhance, extend and/or sustain the functionality of the rear view device during normal or extreme conditions. This can include heating and/or cooling means, cleaning means such as wipers, liquid and/or gaseous sprays, actuator means for moving the rear view device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rear view devices include illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices can include for example a tiredness detection system, a micro-sleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device can include a plurality of different optical elements, a.o. a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3. Further, the camera can include for example CCD or CMOS or light field sensors, as for example described in German patent application No. 102011053999. Also an area of the sensor can be reserved for different purposes, for example to detect a test beam, as described in U.S. Pat. No. 8,031,224. The camera module can also be equipped with apparatuses for light intensity adjustment as described for example in U.S. patent application Ser. No. 14/809,509 and light level intensifier tubes as described in U.S. patent application Ser. No. 09/771,140. Still further, the camera module or a cover adapted to the camera module can be moved using different actuators, drives and/or a flexible track, as for example described in German application No. 102016108247.3.

The camera module can also include cleaning elements to clean the optical element facing outwards and being exposed to the environment. The cleaning element can for example include wipers, brushes, lips, nozzles, fans and similar elements as are described in European patent application No. 14165197.6, European patent application No. 13163677.1, and European patent No. 1673260. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224. Also light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0.

A watertight seal against weather effects, as well as against the influence of washing processes with detergents, solvents and high pressure cleaners can be used on the housing of the camera module as described in U.S. patent application Ser. No. 13/090,127. Alternatively, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as for example the snap-fit connection described in European patent No. 2233360.

Shape memory alloys (SMA) are used for various functions with rear view devices. European patent application No. 3098444 relates to an actuator device for a rear view device of a motor vehicle including: at least one retaining element; at least one adjusting element which can be transferred into a plurality of functional positions, in particular from a basic position into at least one end position; at least one driving means which includes at least one shape-memory element which is, in particular, in the form of a wire, which extends between the retaining element and the adjusting element and can be or is secured to both, where the extension of said shape-memory element can be modified on being actuated, in particular on being electrically energized, and by means of the modification of the extension of which the at least one adjusting element can be transferred from one functional position into another functional position, in particular from the basic position into the end position or vice versa; at least one heat-conducting means which lies in contact with the driving means at least in the end position of the adjusting element; and wherein at least one switching means, by means of which the at least one driving means and the at least one heat-conducting means can be or are arranged with respect to one another with no contact in the basic position of the adjusting element and/or by means of which the at least one driving means and the at least one heat-conducting means can be or are arranged touching one another at least in sections at least in the end position of the adjusting element. A further actuator for an exterior rear view mirror of a vehicle is known from European patent application No. 2781743 and has at least one actuator pin, at least one drum body enclosing a cavity, in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction, characterized in that the clamping means and/or the return means can be fixed or are fixed on a winding portion of the drum body and in the winding portion of the drum body at least quarter of a winding, in particular at least half a winding, in particular an entire winding, in particular several windings are applied.

Thus, external rear view devices, in particular rear view mirrors for commercial vehicles, usually include a pivot joint joining a base portion of the device with a pivotable arm carrying the rear view device, generally a mirror glass, itself. Due to vibrations caused by the movement of the vehicle, the pivot joint is experiencing mechanical stress and wear. This in turn increases the freedom of movement of the joint, leading to larger vibrational stress and thus to increased wear.

WO 2014/206 926 A1 describes a pivot joint for a rear view mirror with a conical centering element which is preloaded by a spring. The force enacted by the spring spreads open the centering element, so that the centering element, regardless of wear, is always fitted and centered with a bearing bushing.

While known rear view devices can reduce wear and vibrations to some extent, they are generally complicated to assemble and require a high amount of parts, hence increasing manufacturing costs.

SUMMARY

In one aspect, a rear view device for a motor vehicle includes a base portion mountable to the motor vehicle and an arm portion for carrying a head with at least one of: a reflective element, display element and/or camera, the arm portion being pivotable relative to the base portion around a bolt, wherein the bolt is providing a pivot axis, is extending through an opening of the base portion and an opening of the arm portion, and is fixed within the base portion; a sequence of a first base plate part, a second base plate part and a spring, which is preferably arranged coaxially around the bolt between the base portion and the arm portion; and a bearing part, which is inserted into the opening of the arm portion; wherein the spring applies an axial force to the second base plate part pressing the same against the first base plate part, and wherein the first base plate part applies a radial spreading force against at least one radial outer wall portion of the second base plate part, holding the second base plate part against the bearing part.

The second base plate part may have a conical shape with a first abutting surface oriented towards the first base plate part, a second abutting surface oriented towards the spring, and a central opening for accommodating the bolt.

The second base plate part may include a first circular groove in the first abutting surface which is complementary to a bracing element formed as a circular shaped ridge of the first base plate part.

The outer wall portion of the second base plate between the first circular groove and a lateral surface of the second base plate part may be flexible.

The second base plate part may include a second circular groove in the second abutting surface for accommodating the spring.

The spring may be supported against a second flange of the base plate part by means of a washer plate.

The rear view device may have a pivot joint portion of the arm part including a detent ramp with at least one detent and/or providing the opening of the arm part.

The pivot joint portion can be arranged coaxially with the bolt to interlock with the detent ramp.

Thus, a rear view device for a motor vehicle may include a base portion mountable to the motor vehicle and an arm portion for carrying a mirror head, the arm portion being pivotable relative to the base portion about a bolt providing a pivot axis and extending through an opening of a first flange of the base portion and an opening of a pivot joint part of the arm portion, the bolt being fixed against a second flange of the base portion by means of a thread. The rear view device may also include a first base plate part, a second base plate part and a spring arranged coaxially with the bolt. The rear view device may include a bearing part inserted into the opening of the pivot joint part of the arm portion. The spring may enact an axial force holding the second base plate part against the first base plate part, and a bracing element of the first base plate part may enact a radial spreading force against at least one radial outer wall portion of the second base plate part, holding the second base plate part against the bearing part. The axial force enacted by the spring, which itself is caused by tightening the bolt, may be translated into a radial force holding the second base plate part against the bearing part via the bracing element of the first base plate part. This ensures a tight fit between the second base plate part and the bearing part, thus avoiding vibrations and wear in the rear view device. The bolt, the first and second base plate parts and the spring may be pre-assembled and easily fitted into the rear view device during its manufacturing by simply tightening the bolt into the thread, thus avoiding the need for complicated locking devices. The entire rear view device may consequently be fast and easy to assemble.

The second base plate part may have a conical shape with a first abutting surface oriented towards the first base plate part, a second abutting surface oriented towards the spring, and a central opening for accommodating the bolt. The conical shape may allow for a tight fit between the second base plate part and the bearing part, which, due to the spreading force of the first base plate part, is self-adjusting even if one of the parts degrades from wear.

The second base plate part may include a first circular groove in the first abutting surface which is complementary to the bracing element formed as a circular shaped ridge of the first base plate part. In other words, the circular groove may delimit the at least one outer wall portion from a center portion of the second base plate part, thus allowing the bracing part to enact the desired radial force upon the outer wall portion. The first circular groove and/or the bracing part may be formed with a wedge-shaped profile. The outer wall of the second base plate part may be segmented to permit greater flexibility when pressure is applied. The segmented slots may extend into the center portion of the part in order to keep the outer walls of the second base plate in line with the inner walls of the bearing part.

The outer wall portion of the second base plate between the first circular groove and a lateral surface of the second base plate part may be flexible. This allows the second base plate part to spread radially under the forces enacted by the spring and the bracing element of the first base plate part.

In The second base plate part may include a second circular groove in the second abutting surface for accommodating the spring. This secures the spring against the second base plate part so that the rear view device is secure against damage caused by vibrations or shock.

The spring may be supported against the second flange by means of a washer plate. The washer plate may prevent direct contact between the spring and the second flange and consequentially help to avoid wear on the second flange which could be caused by a relative movement between the spring and the second flange.

The pivot joint portion of the arm part may include a detent ramp. Such a detent ramp may allow for holding the arm part in predefined positions relative to the base part. Since the detent ramp is integrated into the arm part, no additional parts are needed and the rear view device may be particularly easily assembled.

The rear view device may include a detent plate arranged coaxially with the bolt and being interlocked with the detent ramp. The detent plate provided the counteracting part to the detent ramp of the arm portion and can be easily exchanged in case of wear of the detent mechanism so that the rear view device is particularly easy to maintain.

The pre-assembly of the bolt, the first and second base plate and the spring may allow for a fast and easy assembly of the rear view device while still securing the base portion against the arm portion in a manner that avoids vibration and wear.

In another aspect, a motor vehicle includes a rear view device as described.

In yet another aspect, a method for assembling a rear view device includes providing a base portion of the rear view device having a first flange with a first opening and a second flange with a second opening, the second opening being threaded, providing an arm portion of the rear view device with a pivot joint part having a further opening, arranging the base portion and the arm portion in a manner for the openings of the base portion and the arm portion to coincide along a pivot axis, providing a pre-assembly arrangement including at least a bolt, with a first base plate part, a second base plate part and a spring being arranged coaxially around the bolt, wherein the second base plate part is adapted to radially expand upon compression in the axial direction of the bolt, and inserting the pre-assembly arrangement through the first opening of the base portion and the further opening of the arm portion and fastening the bolt within the threaded second opening of the base portion, thereby compressing the second base plate part in the axial direction of the bolt.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
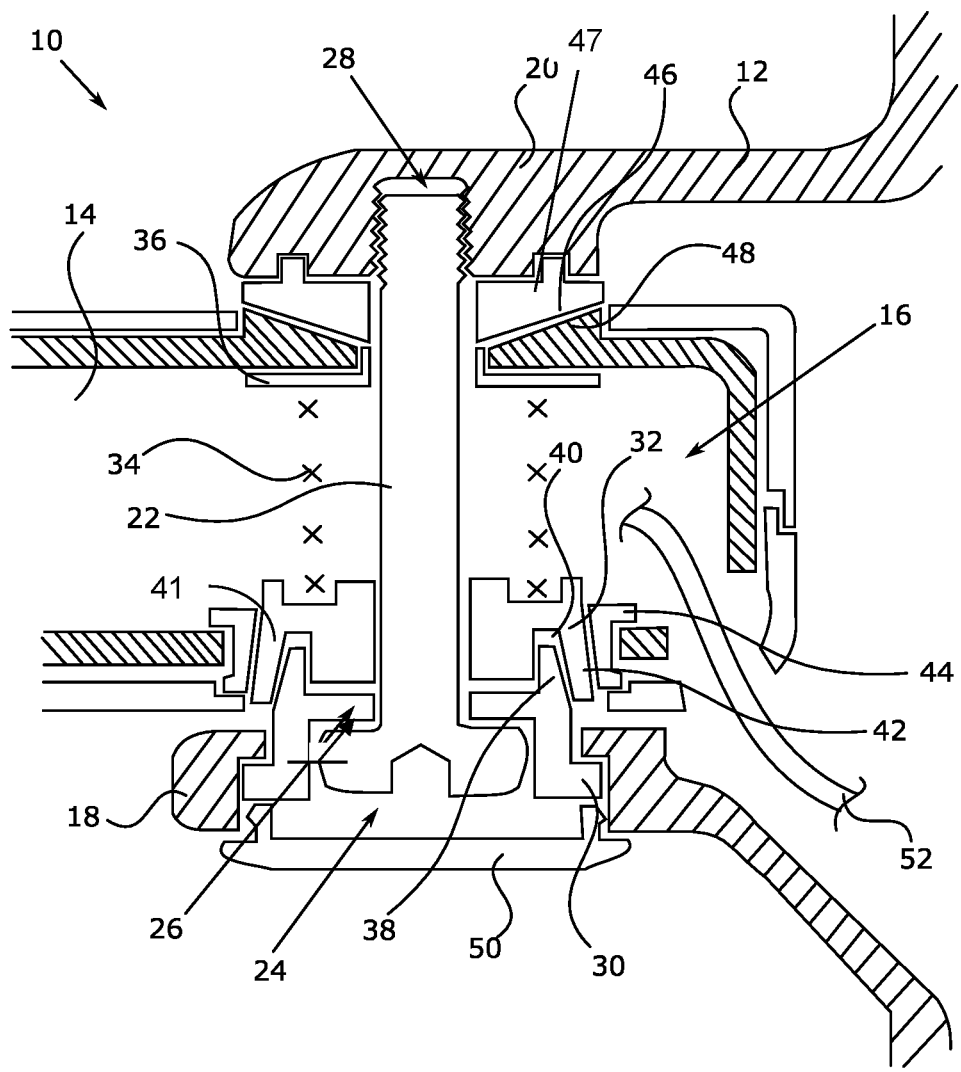
FIG. 1 illustrates a cross-sectional view of an example of a rear view device.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The term "rear view" is here defined as a view of the surrounding area, which is not in the field of view of a driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

In an example, a rear view device 10 for a commercial motor vehicle includes a base portion 12, which is mountable to the motor vehicle, and an arm portion 14, which is pivotable relative to the base portion and carrying, for example, a mirror glass. A pivot joint part 16 of the arm portion 14 may be secured between a first flange 18 and a second flange 20 of the base portion 12. A bolt 22 extends through an opening 24 of the first flange 18 and an opening 26 of the pivot joint part 16 and is secured in a threaded opening 28 of the second flange 20 by a complementary thread. The bolt 22 provides a pivot axis between the base portion 12 and the arm portion 14.

Arranged coaxially with the bolt 22 are a first base plate part 30, a second base plate part 32, a spring 34 and a spring washer 36. When the bolt 22 is tightened in the threaded opening 28, the spring 34 may be compressed between the spring washer 36 and the second base plate part 32 providing a groove 41 for aligning the spring 34. The compression of the spring 34 leads to pressing the second base plate part 32 against the first base plate part 30. As a result of this axial force, a bracing element 38 of the first base plate part 30, which has a wedge-shaped cross-section, is pressed into a groove 40 of the second base plate part 32. This forces a flexible outer wall portion 42 of the second base plate part 32 radially outwards and secures the second base plate part 32 against a bearing part 44, which is inserted into the opening 26 of the pivot joint part 16 of the arm portion 14. The outer wall 42 of the second base plate part 32 may be segmented to permit greater flexibility when pressure is applied. In another example, the segmented slots may extend into the center portion of the part in order to keep the outer walls 42 of the second base plate 32 in line with the inner walls of the bearing part 44.

The tight fit between the second base plate part 32 and the bearing part 44 may prevent vibrations between the arm portion 14 and the base portion 12 in the area of the pivot joint 16, thus reducing mechanical wear of the rear view device. Even if the second base plate part 32 or the bearing part 44 degrades due to wear, the pressure enacted by the spring 34 helps this arrangement to self-adjust so that the radial pressure towards the bearing part 44 is always maintained and the fit remains tight.

The rear view device 10 may further include a detent disc 46, which is also arranged coaxially with the bolt 22 and held between the second flange 20 and a corresponding detent ramp 48 of the pivot part 16 of the arm portion 14. The detent disc 46 may interlock with the detent ramp 48 in predefined orientations, thus allowing the arm portion 14 to lock against the base portion 12 at defined angular positions with at least one detent 47 of the detent device 46 engaging the base portion 12.

To provide protection from water, dust and the like, the opening 24 may be closed with a cap 50. A cable 52 may lead from an interior of the base portion 12 to an interior space of the arm portion 14 to provide electrical energy and command signals to electrical components (not shown) of the rear view device 10, such as lighting modules, mirror heaters, additional sensors, cameras or the like.

Figure 2:
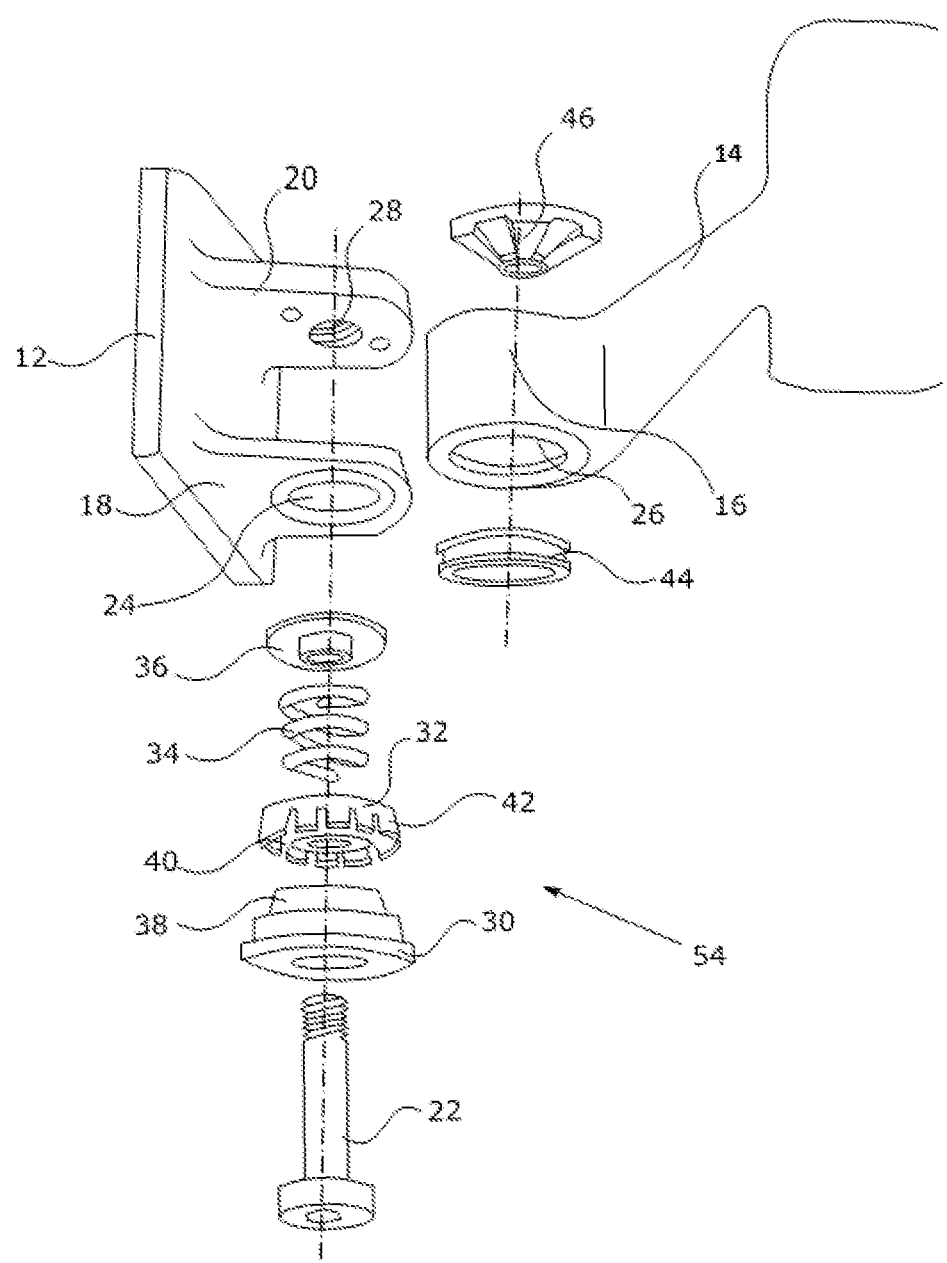
FIG. 2 illustrates an exploded view of an example of the rear view device according to FIG. 1.

Referring to FIG. 2, the first base plate part 30, the second base plate part 32, the spring 34 and the spring washer 36 may be pre-assembled on the bolt 22. This pre-assembly arrangement 54 can then be inserted through the openings 24 and 26. By threading the bolt 22 into the threaded opening 28, the spring 34 may be compressed in order to enact an axial force on the second base plate part 32, which is in turn forced by the bracing element 38 of the first base plate part 30 to spread and to enact a radial force against the bearing part 44.

This allows for a particularly wear- and vibration-resistant rear view device 10 which is also simple to assemble.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 10 rear view device
12 base portion
14 arm portion
16 pivot joint part
18 first flange
20 second flange 22 bolt
24 opening
26 opening
28 threaded opening
30 first base plate part
32 second base plate part
34 spring
36 spring washer
38 bracing element
40 groove
41 groove
42 outer wall portion
44 bearing part
46 detent disc
46 detent
48 detent ramp
50 cap
52 cable
54 pre-assembly arrangement

What is claimed is:

1. A rear view device for a motor vehicle, comprising:
a base portion mountable to the motor vehicle;
an arm portion for carrying a head with at least one of a reflective element, a display element, and a camera, the arm portion being pivotable relative to the base portion around a bolt, the bolt providing a pivot axis, extending through an opening of the base portion and an opening of the arm portion, and fixed within the base portion;
a sequence of a first base plate part, a second base plate part, and a spring; and
a bearing part which is inserted into the opening of the arm portion;
wherein the spring applies an axial force to the second base plate part pressing the second base plate part against the first base plate part,
wherein the first base plate part applies a radial spreading force against at least one radial outer wall portion of the second base plate part, holding the second base plate part against the bearing part,
wherein the second base plate part has a conical shape with a first abutting surface oriented towards the first base plate part, a second abutting surface oriented towards the spring, and a central opening for accommodating the bolt,
wherein the second base plate part comprises a first circular groove in the first abutting surface which is complementary to a bracing element formed as a circular shaped ridge of the first base plate part,
wherein the at least one outer wall portion of the second base plate part is flexible, and
wherein as a result of the axial force applied by the spring, the bracing element of the first base plate part is pressed into the first circular groove of the second base plate part and this forces the at least one flexible outer wall portion of the second base plate part radially outwards and secures the second base plate pan against the bearing part.

2. The rear view device according to claim 1, wherein the second base plate part comprises a second circular groove in the second abutting surface for accommodating the spring.

3. The rear view device according to claim 1, wherein the spring is at least one of arranged coaxially around the bolt between the base portion and the arm portion and supported against a second flange of the base plate part by means of a washer plate.

4. The rear view device according to claim 1, wherein the arm portion comprises a pivot joint portion which at least one of comprises a detent ramp with at least one detent and provides the opening of the arm portion.

5. The rear view device according to claim 4, wherein the pivot joint portion provides the opening of the arm portion and is arranged coaxially with the bolt to interlock with the detent ramp.

6. A motor vehicle comprising a rear view device according to claim 1.

7. A method for assembling a rear view device, comprising:
providing the rear view device, comprising:
a base portion mountable to the motor vehicle;
an arm portion for carrying a head with at least one of a reflective element, a display element, and a camera, the arm portion being pivotable relative to the base portion around a bolt, the bolt providing a pivot axis, extending through one or more openings of the base portion and an opening of the arm portion, and fixed within the base portion;
a sequence of a first base plate part, a second base plate part, and a spring; and
a bearing part which is inserted into the opening of the arm portion;
wherein the spring applies an axial force to the second base plate part pressing the second base plate part against the first base plate part,
wherein the first base plate part applies a radial spreading force against at least one radial outer wall portion of the second base plate part, holding the second base plate part against the bearing part,
wherein the second base plate part has a conical shape with a first abutting surface oriented towards the first base plate part, a second abutting surface oriented towards the spring, and a central opening for accommodating the bolt,
wherein the second base plate part comprises a first circular groove in the first abutting surface which is complementary to a bracing element formed as a circular shaped ridge of the first base plate part,
wherein the at least one outer wall portion of the second base plate part is flexible, and
wherein as a result of the axial force applied by the spring, the bracing element of the first base plate part is pressed into the first circular groove of the second base plate part and this forces the at least one flexible outer wall portion of the second base plate part radially outwards and secures the second base plate pan against the bearing part;
providing the base portion of the rear view device having a first flange with a first opening of the one or more openings and a second flange with a second opening of the one or openings, the second opening being threaded;
providing the arm portion of the rear view device with a pivot joint part having a further opening;
arranging the base portion and the arm portion in a manner for the openings of the base portion and the arm portion to coincide along the pivot axis;
providing a pre-assembly arrangement including at least the bolt, with the first base plate part, the second base plate part and the spring being arranged coaxially around the bolt, wherein the second base plate part is adapted to radially expand upon compression in the axial direction of the bolt; and
inserting the pre-assembly arrangement through the first opening of the base portion and the further opening of the arm portion and fastening the bolt within the threaded second opening of the base portion thereby compressing the second base plate part in the axial direction of the bolt.

* * * * *